Oct. 15, 1963 J. O. JONES ETAL 3,107,049

TYPEWRITER TAPE PUNCH WITH PROGRAM CONTROL

Filed May 23, 1961 3 Sheets-Sheet 1

INVENTORS.
J. O. JONES
D. W. BERNARD
J. M. COLAGROSSI

BY

ATTORNEYS.

TYPEWRITER TAPE PUNCH WITH PROGRAM CONTROL
Filed May 23, 1961 3 Sheets-Sheet 2
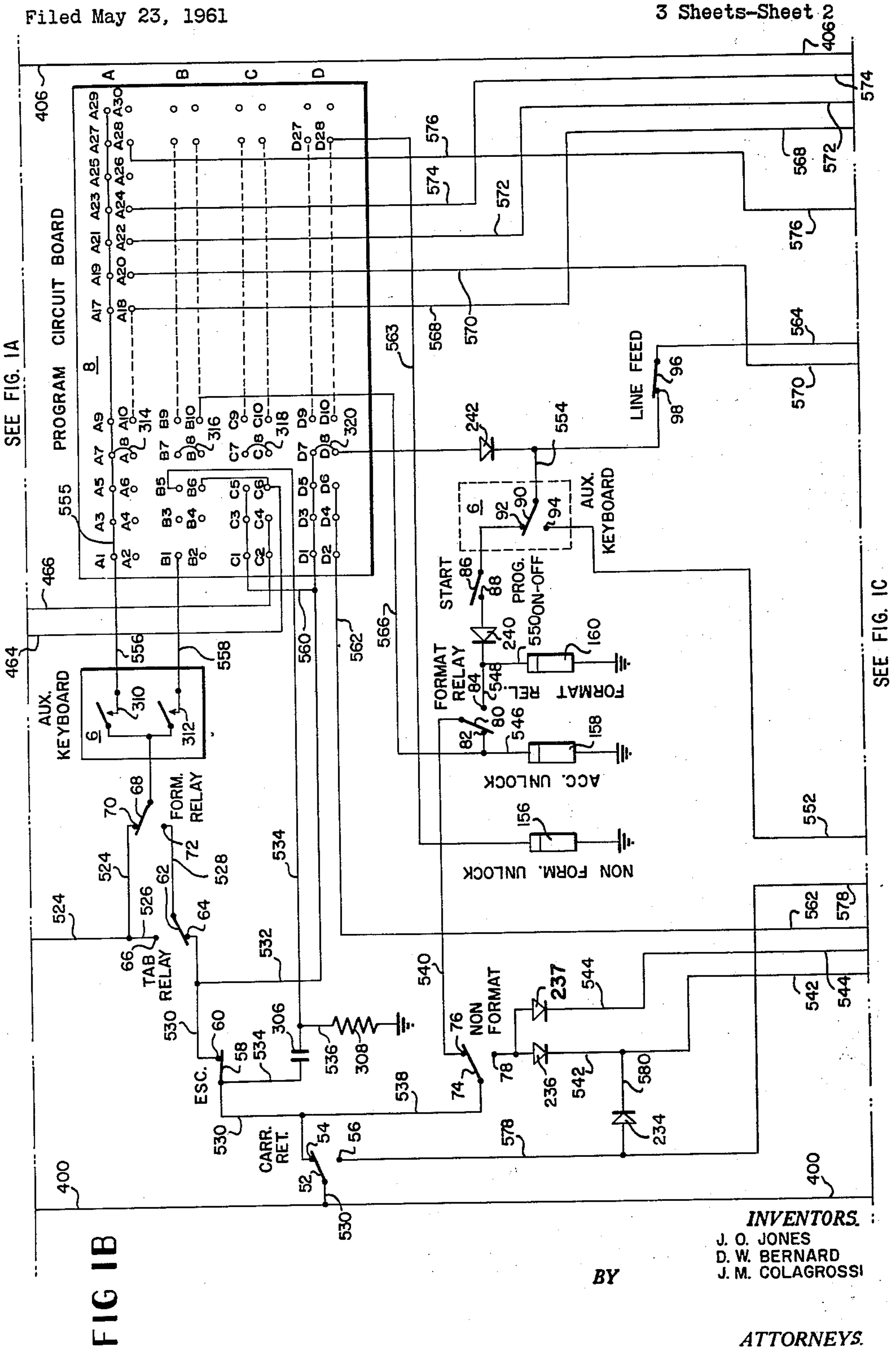
FIG IB
INVENTORS.
J. O. JONES
D. W. BERNARD
J. M. COLAGROSSI
BY
ATTORNEYS.

TYPEWRITER TAPE PUNCH WITH PROGRAM CONTROL
Filed May 23, 1961 3 Sheets-Sheet 3
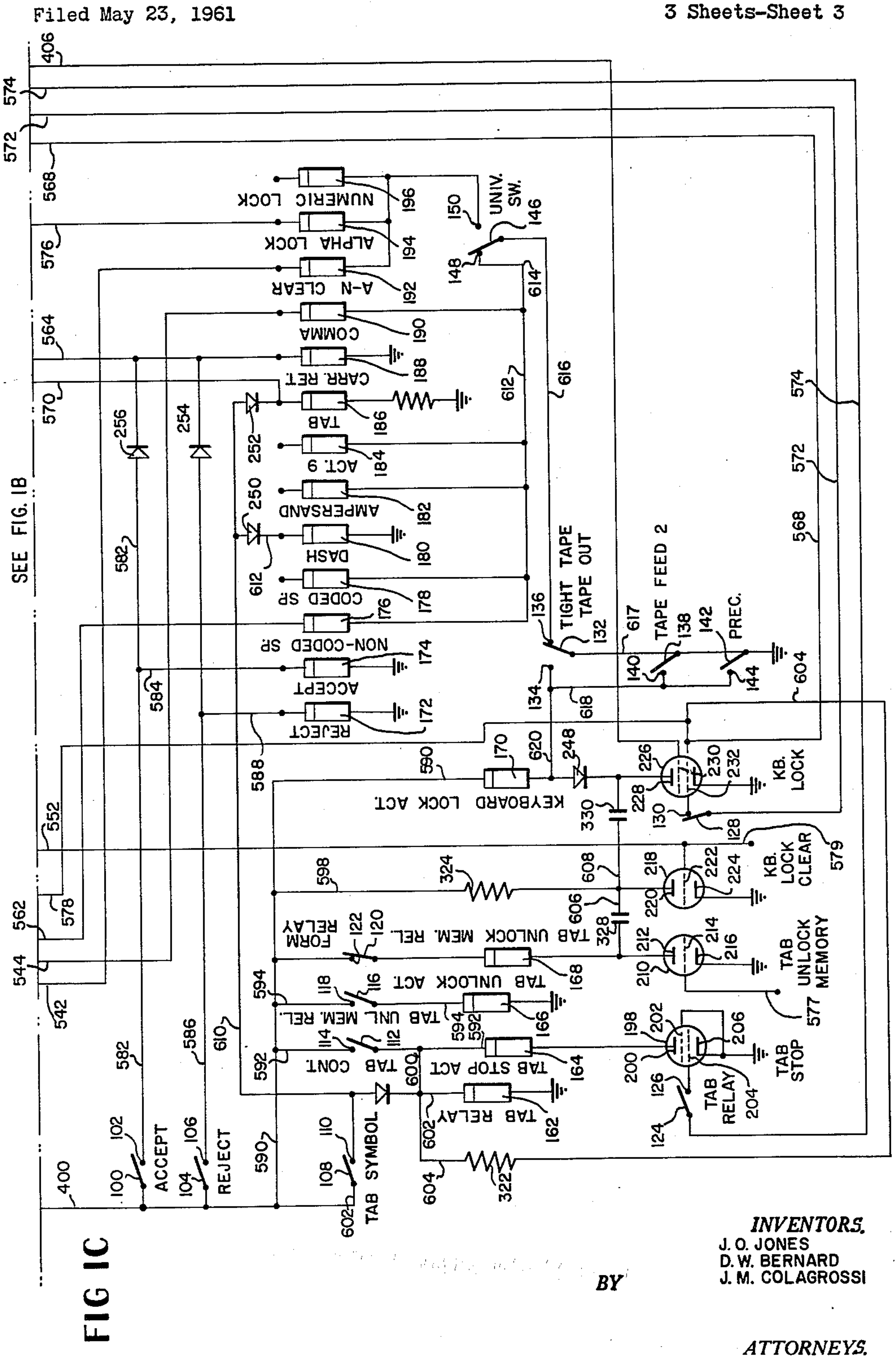
FIG IC
INVENTORS.
J. O. JONES
D. W. BERNARD
J. M. COLAGROSSI
BY
ATTORNEYS.

United States Patent Office 3,107,049

Patented Oct. 15, 1963

3,107,049

TYPEWRITER TAPE PUNCH WITH PROGRAM CONTROL

James O. Jones, Bridgeport, David W. Bernard, Norwalk, and Joseph M. Colagrossi, Stratford, Conn., assignors to Sperry Rand Corporation, New York, N.Y., a corporation of Delaware Filed May 23, 1961, Ser. No. 112,092

16 Claims. (Cl. 234—15)

This invention relates to a typewriter controlled tape punching system and more particularly to such a system offering simplified, variable format control.

Systems of this type record manually typed information on punched tape in the form of coded perforations. In addition to the alphabetic and numeric characters which must be encoded, certain typewriter functions must be controlled, and the machine function codes must also be entered in the tape for use by the processing device at the time when the recorded information is to be retrieved and utilized.

The present system is advantageously use in the type of operation in which the operator constantly repeats the typing operation involving the entry of random information into a printed bill form or the like. In such cases, there may be the repetitive placement of certain alphabetic and numeric information in certain areas within the form requiring a relatively large number of automatic repetitive machine functions. The operator may be further required to change from one bill form to another, both requiring repetitive operations.

In a system of this type, it is also extremely desirable to use a minimum number of code designations, or bits, on the tape so that the tape will hold the maximum amount of information in the minimum area. In order to maximize the amount of information recorded with a given number of bits, the same code may be used for both an alphabetic and a numeric character if an additional code is added to the tape indicating a change from letter characters to numeric or figure characters and vice versa. Such an additional code is referred to as a precedence code. The particular arrangement for the precedence code is set forth in detail in the copending application entitled "Change of Character Detector for Typewriter Controlled Punch," to David W. Bernard, Serial No. 47,206, filed August 3, 1960, assigned to the common assignee.

It is therefore a primary object of this invention to provide an improved typewriter controlled tape punch system employing simplified format operation in which one of a relatively large number of formats may be instantaneously selected.

It is a further object of this invention to provide an improved format controlled typewriter operated tape punch in which automatic functions may be performed during the typing operation and simultaneously entered into the tape in the form of coded information.

It is a further object of this invention to provide means in which the functions are automatically entered as the typewriter carriage moves across the typewriter under normal operation.

Other objects and advantages of the invention will become apparent from the following detailed description taken in connection with the accompanying drawings, in which:

FIGURE 1B is a second portion of the simplified schematic diagram of the circuit logic of the sytem;

FIGURE 1C is yet a third portion of the simplified circuit diagram of the present invention.

Figure 1A:
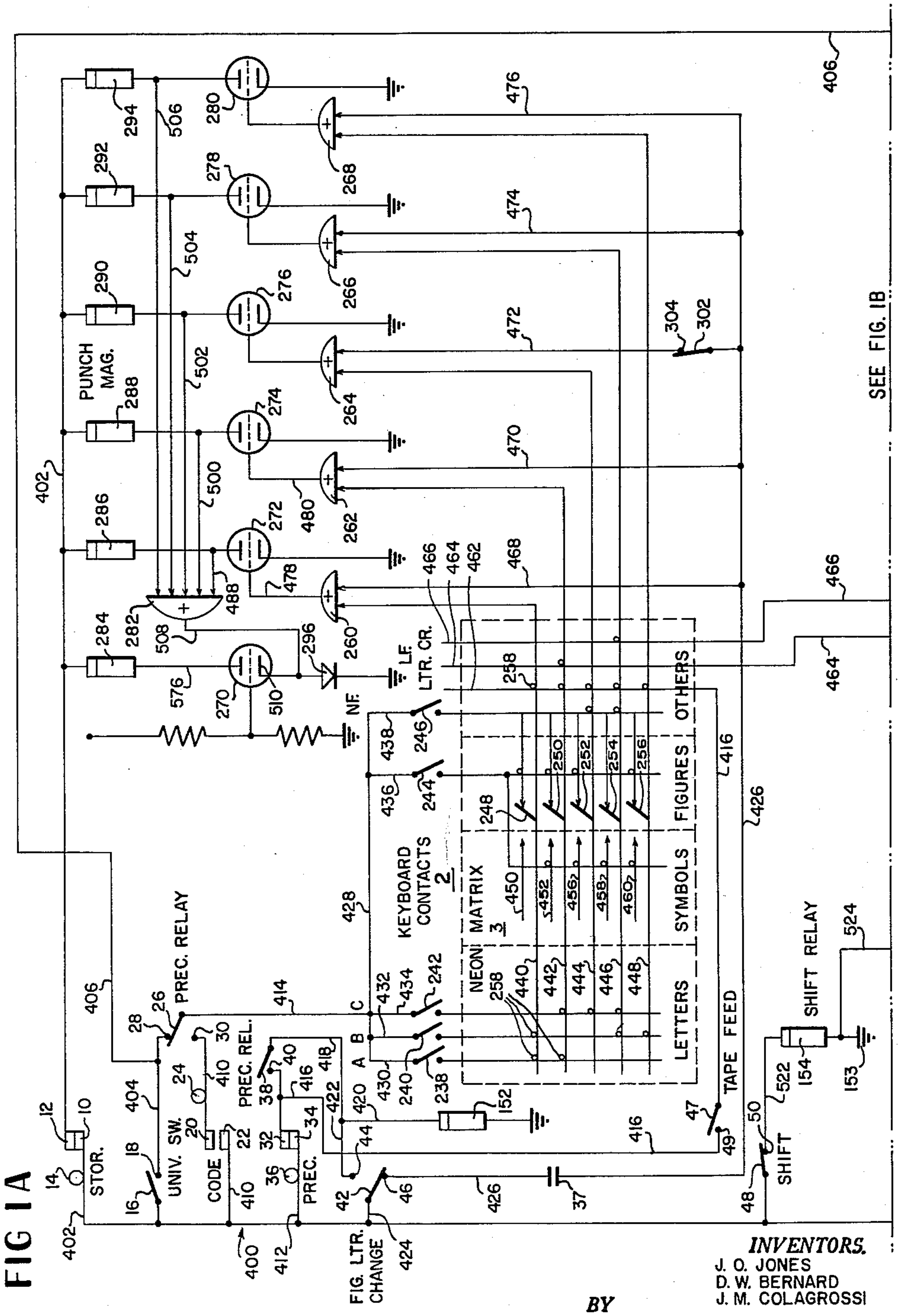
FIGURE 1A is a portion of the simplified schematic diagram of the typewriter controlled tape punching system of the present invention.

Briefly, the present invention resides in a typewriter controlled tape punch system which includes a typewriter having a main keyboard for initiating desired typewriter functions and a moving carriage. The system further includes a plurality of punch magnets for punching coded information representative of said typewriter functions into the tape, and means responsive to actuation of the main keyboard for selectively energizing certain ones of said punch magnets. The system further includes a stationary program circuit board positioned adjacent the moving carriage with the circuit board including a plurality of spaced, insulated contacts. A plurality of typewriter function initiating actuators are connected to the individual spaced contacts. The typewriter carriage includes electrical potential applying means movable with the carriage for sequentially contacting the circuit board contacts for energizing automatically selected ones of the function performing actuators for operating the typewriter independently of the main keyboard.

Referring now to the drawings, there is shown a main typewriter keyboard indicated generally at 2 including a plurality of Switches, 238, 240, 242, etc., which close upon manual depression of the keyboard (not shown) to complete electrical circuits through a Neon Matrix 3 which includes a number of vertical Matrix leads such as 430, 432, 434, etc., and a number of cooperating horizonal Matrix Leads 440, 442, 444, etc. A number of OR gates 260, 262, etc., are connected to the Neon Matrix 3 for energizing related Punch Magnet Thyratron Tubes 272–280, thus completing electrical circuits to the Punch Magnets 286, 288, etc. Firing of any of the Thyratrons 272–280 completes an electrical circuit through OR gate 282 to fire the Punch Clutch Magnet tube 270. Energization of the Punch Clutch Magnet 284 acts to punch in the appropriate code designations in the tape and open the Storage Contacts 10 and 12 de-energizing the punch magnets and the punch clutch magnets. The Storage Cam Contacts 10 and 12, the Code Cam Contacts 20 and 22 and the Precedence Contacts 32 and 34 are sequentially opened and closed by means of cams operating under the influence of the Punch Clutch Magnet 284 to provide a desired operation. This operation is fully described in the copending application entitled "Change of Character Detector for Typewriter Controlled Punch" to David W. Bernard, Serial No. 47,206, filed August 3, 1960, assigned to the common assignee. The circuit further includes a figures, letters change switch including Movable Contact 42 and Stationary Contacts 44 and 46 to effect the entrance of an appropriate precedence code into the tape when changing from figures to letters or vice versa as discussed in detail in the aforementioned copending application. Shift Relay 154 is included to cause a number of neon matrix switches to change, thus allowing a single key to effect two varying code designations within the tape depending upon the use of a shift key associated normally with the typewriter.

The system further includes a stationary Program Circuit Board 8, employing a plurality of spaced rows of contacts indicated at A, B, C, and D, with electrical potential being applied to the program circuit board by means of appropriate keys upon an auxiliary keyboard indicated at 6, which, in the preferred embodiment includes eleven program selection keys for setting up eleven different format operations depending upon which of the selection keys has been depressed. The Auxiliary Keyboard 6 also includes a Program ON-OFF switch and acts in conjunction with a start switch for initiating format operation. Under format operation, movement of the typewriter carriage (not shown) acts to complete electrical circuits to appropriate function performing actuators or relays such as Coded Space Relay 178, Ampersand Relay 182, Character (9) Actuator 184, Tab Relay 186, Carriage Return Relay 188, Comma Actuator 190, Alpha-Numeric Clear Actuator 192, Numeric Lock Actuator 196 by means of a number of Commutator Brushes 314, 316, 318, and 320, which act to bridge aligned, spaced contacts within the Program Circuit Board Rows A, B, C, D, etc.

The system further includes a number of key operated switches such as Accept Switch Contacts 100 and 102, Reject Contacts 104–106 and Tab Symbol Contacts 108–110 for manually initiating appropriate code designations indicating the acceptance or rejection of information printed by the typewriter as well as insertion of information indicating a tabulating function.

Since the main keyboard must not be operated simultaneously with the automatic energization of function performing actuators associated with the program circuit board, means are provided in the present system for locking up the main keyboard when the machine is operating under automatic format. Since it may be desirable to insert remarks between certain carriage positions during automatic format operation, it is necessary to unlock the main keyboard when the carriage is between these positions. In these cases, the operator is permitted to go out of format at those carriage positions where a non-format key unlock has been programmed by operation of the non-format Movable Switch Contact 74.

Depression of either Accept or Reject Keys initiates return movement of the typewriter carriage from right to left, moving Carriage Return Contact 52 from 54 to 56. At the end of carriage travel Switch 52 returns to Contact 54. Whenever the carriage is returned, means are employed for automatically entering carriage return and line feed codes into the tape by means of the first three columns of the Program Circuit Board 8. In addition, Manual Line Feed Switch Contacts 98 and 96 may be closed at any time when the typewriter is in the fourth column position to initiate the entrance of a line feed code designation within the tape, while causing a line spacing of the paper in the typewriter platen.

When the machine is operating under format, it is of course necessary to insure that prior to an automatic function being performed by the program circuit board, the main keyboard is locked up so that no double entry can be made. The present invention makes use of a Keyboard Lock Tube 226, which is fired one carriage position preceding any format function resulting in energization of a Keyboard Lock Actuator 170 interposing mechanical interposers which may take the form of a standard typewriter interlock bail, preventing depression thereof. The keyboard lock actuator may be energized by other means during a precedence change code entry or during tape feed or tight tape-tape out operations. In order to de-energize the Keyboard Lock Actuator 170 under normal circumstances, the Keyboard Lock Tube 226 must be de-energized. This is performed in the present invention by the Keyboard Lock Clear Tube 218 or the Tab Unlock Memory Tube 210. The firing of either of these tubes acts to extinguish the keyboard lock tube by capacitive coupling through Capacitors 328 and 330.

The system further includes a Tab Stop Tube 198 which is fired by a suitable connection to the program circuit board to energize the Tab Stop Actuator 164 at the appropriate space under programmed format. Of course, the tabulation symbol may be punched in the tape by the manual depression of the Tab Symbol Key Closing Contacts 108–110 as indicated previously.

With this brief description of the principal components of the system in mind, the amplified description of the operation of the individual components of the circuit shown in FIGS. 1A, 1B, and 1C will now be given, the description being broken down into the various operations depending upon the particular function being carried out:

*Function—Manual Typing and Punching Cycle (No Precedence Change)*

When any one of the keys of Keyboard 2 is depressed, a particular letter code or numeral is typed. For example, manual depression of the key operating Keyboard Contact 238 results in a circuit being set up through the Neon Matrix 3 by way of Horizontal Matrix Lead 440, Neon Lamp 258, Vertical Matrix Lead 430, Common Leads 428 and 414, Precedence Relay Contacts 26 and 28, Lead 404, and Universal Switch Contacts 16 and 18 to a suitable source of B+ Current 400 which in the present invention may take the form of a positive voltage of 165 volts. A circuit is thus completed through the aforementioned leads and elements by means of Horizontal Neon Matrix Lead 440 to the input side of OR gate 260 and by means of Lead 478 to the grid of Thyratron Tube 272, firing the tube and causing Punch Magnet Relay 286 to be energized. In like manner, closure of Keyboard Contact 238 also results in a circuit being completed through a common Vertical Matrix Lead 430 to the Horizontal Matrix Lead 442, OR gate 262, Lead 480 to the grid of Thyratron Tube 274, thus firing the tube and energizing Punch Magnet 288. The remaining set of OR gates 264, 266, and 268 and their associated thyratrons and punch magnets remain unenergized since the Letters Code for the Letter A calls for the punching of the punches associated only with Punch Magnets 286 and 288. Subsequent to the energization of the Thyratrons 272 and 274, a circuit is completed to OR gate 282 with the resultant drop in plate voltage of the Thyratrons 272 and 274 being coupled through OR gate 282 to the Cathode 510 of Thyratron 270, causing Tube 270 to fire and energizing the Punch Clutch Magnet 284 with the resultant punching of the appropriate code designation in the tape. Subsequently, the Storage Switch Contacts 10 and 12 are opened by rotation of Cam 14, removing the plate potential from Thyratrons 270, 272, and 274 through Common 402. When the A key, for instance, is depressed closing Keyboard Contacts Switch 238, mechanical means associated with the Ribbon Universal Bar (not shown) acts to close normally open Universal Switch Contacts 16 and 18, initiating the punching sequence.

*Function—Shift*

In a shift operation in which, for instance, it is desirous to change from a figure, such as the numeral 1, to a symbol, which are both controlled by the same key, depression of the Shift Key causes a change in the Neon Matrix connections. Shift Relay 154 is energized by the manual depression of Shift Key on the Keyboard acting to close normally open Shift Contacts 48 and 50 to complete an electrical circuit from the B+ Line 400 through Line 522, Shift Relay 154 to ground connection 153. This causes the vertical row of Neon Matrix Switches 248, 250, 252, 254, and 256 to pivot from a position inclined to the right as shown in FIGURE 1A to a position inclined to the left. Thus, if the numeral Switch Key 1 is depressed during the time the Shift Key is depressed, a circuit is completed from B+ 400 through Line 404, Universal Switch Contacts 16 and 18, Precedence Relay Contacts 26–28, Line 414, Keyboard Common 428, Vertical Neon Matrix Lead 436, Matrix Lead 437, Horizontal Matrix Leads 452, 456, 458, and 460 through movable Matrix Switch Contacts 250, 252, 254, and 256 to Horizontal Matrix Leads 442, 444, 446, 448 to complete circuits to the OR gates 262, 264, 266 and 268, thus energizing Punch Magnets 288, 290, 292, and 294 to effect a desired code punching for the symbol associated with this key. Were it not for the Shift Relay operation, the circuit would have been completed through Vertical Matrix Lead 436, Horizontal Matrix Leads 450, 452, 456, and 460, Neon Matrix Shift Relay Pivotable Contacts 248, 250, 252, and 256 to Horizontal Matrix Leads 440, 442, 444, and 448 to complete a circuit to OR gates 260, 262, 264, and 268 for energizing Punch Magnets 286, 288, 290, and 294 to achieve a completely different code designation within the tape. The Typing and Punching sequence are the same as described previously for Manual Typing.

*Function—Manual Typing and Punching Cycle (With Precedence Change)*

The mechanical structure for detecting a Precedence change is best shown in application Serial No. 47,206 entitled "Change of Character Detector for Typewriter Control Punch," to David W. Bernard and to the common assignee of the present invention. That application shows a mechanical bail whose position is shifted each time there is a change from typing of a letter to typing of a numeral. When such a change occurs, Movable Contact 42 of the Figures/Letters Change Switch momentarily toggles from Stationary Contact 46 and makes contact with Stationary Contact 44. This causes a circuit to be completed from the B+ Line 400 through Lead 424, Movable Contact 42, Stationary Contact 44, Lines 422 and 420 to the Precedence Relay 152, thus energizing this relay. The Precedence Relay 152 is locked in by the completion of a circuit through Lead 418, normally open Precedence Relay contacts 38 and 40, normally closed Precedence Cam Contacts 32 and 34 and Lead 412 to the B+ Supply 400. The mechanical bail described in the aforementioned application also actuates Switch Contacts 302 and 304 connected in Line 472 leading to OR gate 264 by sequentially opening and closing these contacts in accordance with the typing of a letter or a numeral. If a letter is to be typed, the switch contacts are closed as indicated in FIGURE 1A, and when a numeral is to be typed the Switch Contacts 302 and 304 are opened. Energization of Precedence Relay 152 also closes normally open Contacts 142 and 144 shown in the lower portion of FIGURE 1C, thus energizing the Keyboard Lock Actuator 170 by completing a circuit from B+ Common 400 through Line 590, the Keyboard Lock Actuator 170, Line 620, Line 618, the Precedence Relay Contacts 142 and 144 and ground. This momentarily locks up the Keyboard until the Precedence code and the code of the Type Character is punched.

When the Figures/Letters Change Switch Contact 42 completes its oscillating movement and returns to Contact 46, a pulse is coupled through capacitor 37 in Line 426 to all OR gates 260, 262, 264, 266, and 268 if a letter is being typed, and is coupled to all of the OR gates with the exception of OR gate 264 if a numeral is being typed. This pulse energizes Punch Magnets 286, 288, 290, 292, and 294 to punch a Letters Precedence code or all of these magnets with the exception of Punch Magnet 290 if a Numerals Precedence code is to be punched. The Clutch Magnet Tube 270 is energized through a drop in the plate voltage of the Punch Magnet Tubes in the same manner as described for manual typing. Simultaneously, one of the keys on the Keyboard 2 is closed. Universal Switch Contacts 16 and 18 close as mentioned above in regard to manual typing. However, no code is punched because of the energization of the Precedence Relay 152.

The closure of the Code Contacts 20 and 22 by rotation of Cam 24 acts to complete a circuit from the B+ Line 400 through Line 410, Contacts 20 and 22, Common 414 to Neon Matrix 3 and to the OR gates by means of the horizontal and vertical matrix leads depending on the particular letters or numbers key depressed. For instance, assuming that the precedence change is from numerals-symbols to letters and letter key A is depressed, a circuit is completed from Common 428 through vertical Matrix Lead 430 to the horizontal Matrix Leads 440 and 442 by way of Neon Lamps 258 to OR gates 260 and 262, firing Thyratrons 272 and 274 and energizing the Punch Magnets 286, 288 and Punch Clutch Magnet 284. Thus, it is the Code Switch Contacts 20 and 22 which act to punch the numbers or symbols code into the tape. Storage Cam 14 rotates to open Storage Contacts 10 and 12 in the manner of the normal manual typing with no precedence change, thus de-energizing the punch magnets and the punch clutch magnets. As a result, first a precedence code and secondly a character code is punched in the tape.

*Function—Program Start*

In the operation of the machine under format, the desired format program is initiated by the selection of one of eleven formats which are set up on the Program Circuit Board 8 through the keys provided on the Auxiliary Keyboard 6. The Auxiliary Keyboard is supplied with eleven Program Selection Switches of which only two are indicated in FIGURE 1B at 310 and 312. In this instance, Program Selection Switch 310 on the Auxiliary Keyboard 6 acts to complete a circuit to the Common Bus 555 through Lead 556, the Common Bus 555 acting to connect all of the top Program Circuit Board Contacts A–1, A–3, A–5, etc., in the A row. A mechanical connection occurs between all of the Program Selection Switches such as 310 and 312. For instance, FIGURE 1B, depression of Switch 310 on the Auxiliary Keyboard acts to cause the Movable Contact 90 of the Program ON-OFF Switch to move from OFF Contact 94 to ON Contact 92, thus completing a circuit from Line 554 to Line 548. After setting up the desired format by the selection of the appropriate Format Selection Switch 310, 312, etc., the format operation is initiated by the Start key acting to close normally open Contacts 86 and 88 to complete a circuit to Format Relay 160 through Lines 550, Diode 240, Line 548, Switch Contacts 88, 86, Program ON Switch Contacts 90 and 92, Line 554, Diode 242 to Line 564, the Program Circuit Board 8, Circuit Board Contact D–8, Format Circuit Board Commutator Brush 320, the Common Lead Connecting Board Contacts D–1, D–3, D–5, and D–7, Line 532, Line 530, Escapement Switch Contacts 58 and 60, Line 530, Carriage Return Contacts 52 and 54 to the B+ Line 400. Energization of Format Relay 160 causes the Format Relay Contacts 80 and 84 to close and Contacts 80 and 82 to open, de-energizing the Accept Unlock Actuator 158. At the same time, a Lock-in circuit is completed from the Format Relay 160 through Lines 550, 548, Format Relay Contacts 80 and 84, Line 540, Non-format Relay Contacts 74 and 76, Line 538 and Carriage Return Contacts 52 and 54, Line 530 and the B+ Common 400. De-energization of the Accept Unlock Relay 158 results in placing an interposer under the Accept key, thus locking up the Accept key during the automatic format operation. Simultaneously, Format Relay Contacts 68 and 72 close, connecting the Program Circuit Board 8 to the source of potential 400. Tracing this circuit, it is completed from Line 400, through Line 530, Carriage Return Contacts 52 and 54, Escapement Switch Contacts 58 and 60, Tab Relay Contacts 64 and 62, Line 528, Format Relay Contacts 72 and 68 to the Auxiliary Keyboard Format Selection Switch 310, Line 556 to the Common 555 of the Program Circuit Board Contact Row A. Line 555 acts as a power bus for all of the row of Contacts A–1 through A–29.

By wiring selective ones of the lower contacts in Row A to the desired function initiating relays or actuators indicated in FIGURE 1C from 172 to 196, any desired format may be set up. For example, when the Program Selection Switch 310 is closed, it may be desirable to lock the alphabetic keys when the carriage reaches a horizontal position such that the single Commutator Brush 314 is across Program Circuit Board Contacts A–27 and A–28. It is only necessary to connect Contact A–28 by means of Line 576 to the Alpha Lock Actuator 194. Numerous other functions may be automatically formated as desired. Since a plurality of Actuators 172–196 are provided, by making suitable connections from the contacts on the Program Circuit Board to any one of these actuators, many desired format functions may be automatically initiated at any desired point. It should be noted that the format program can be initiated only when the typewriter carriage is in such a position that the movable Commutator Brushes 304, 316, 318, and 320, etc., are in column 4, that is, in a position to make the desired connections across Program Circuit Board Contacts A–7 and A–8 or B–7 and B–8, etc. Only in this position will a circuit be completed to energize the Format Relay 160 through Circuit Board Contacts D–7, D–8.

*Function—Accept*

Under a non-formated program, the Accept Key 100 is always unlocked by a suitable connection from the B+ Supply or Common 400 through Carriage Return Switch Contacts 52 and 54, Line 530, Line 538, Non-format Switch Contacts 74 and 76, Line 540, Format Relay Switch Contacts 80 and 82, and Line 546 to the Accept Unlock Relay 158. This removes the Accept Key Interlock from beneath the Accept Key. However, when in format, the Accept Key is unlocked only by a connection from the Program Board 8 to the Accept Unlock Actuator 158. This is desirable because under format control, the Format Relay 160 is energized, thus the Format Relay Contacts 80 and 82 are broken and contacts 80 and 84 are closed automatically resulting in the de-energization of the Accept Unlock Actuator 158. A suitable connection from the Program Board 8 may take the form of a Lead 566 running from Format Circuit Board Contact B–10 to the Accept Unlock Actuator 158, the circuit being completed through the Format Switch 312, Program Circuit Board Contacts B–9 and B–10 by means of moving Commutator Brush 316.

The depression of the Accept Key closes Accept Switch Contacts 100 and 102, FIGURE 1C, completing a circuit from the B+ Line 400 through Line 582 to Branch Line 584 and the Accept Actuator 174, causing the Accept Symbol to be printed. Simultaneously, a circuit is completed through Line 582, Diode 256, Line 564 to the Carriage Return Actuator 188. This causes the Carriage Return Contacts 52 and 54 to be closed, resulting in initiation of the carriage return motion. During the return of the carriage, the Escapement Switch Contacts 58 and 60 open and remain open during the entire carriage return action. Closure of Carriage Return Contacts 52 and 56 causes the B+ connection from Line 400 to the Program Board 8 to be broken. The Format Relay 160 is de-energized upon the opening of Carriage Return Contacts 52 and 56, and Line 578 is connected to Grid 232 of the Keyboard Lock Tube 226. A circuit is also completed through Diode 234 and Line 580 to the Line 542, energizing the Alpha-Numeric Clear Actuator 192. The timing action of the Accept code causes the Universal Switch Contacts 16 and 18 to close acting to energize Grid 230 of the Keyboard Lock Tube through Line 406. With both Grids 230 and 232 energized, the Tube 226 conducts causing subsequent energization of the Keyboard Lock Actuator 170, locking up the keyboard. When the Accept Key is depressed at the end of a formated program, closing Contacts 100 and 102, the Keyboard Lock Actuator 170 is energized as described and remains energized. Machine operation is possible only by depressing the Start Switch to close Contacts 88 and 86 to begin another formated program, or by depressing the Program OFF Switch to initiate a circuit between lines 554 and 552 through Contacts 90 and 94 on the Auxiliary Keyboard 6. This fires Keyboard Lock Clear Tube 218, de-energizing Keyboard Lock Tube 226 by capacitive coupling and also Keyboard Lock Actuator 170. When the typewriter carriage returns to the zero column or to the extreme left of the Program Circuit Board 8, the transfer of the Carriage Return Switch Contact 52 from Stationary Contact 56 to Stationary Contact 54 occurs. Simultaneously, the return of the typewriter carriage to the extreme left or the zero column results in the closure of Escapement Switch Contacts 58 and 60. Closure of Start Switch Contacts 86–88 acts to re-complete a circuit from the B+ Source 400 to the Program Circuit Board 8.

In order to punch the carriage return code and line feed code when the carriage returns to the left-hand margin, the Auxiliary Keyboard 6 is by-passed. In this regard, B+ is applied from Line 400 through Line 530, Carriage Return Contacts 52, 54, Escapement Switch Contacts 58 and 60, Line 532 to Program Circuit Board Contacts D–1, D–3, D–5, D–7. When the Commutator Brush 320 bridges Contacts D–1 and D–2 the Non-coded Space Actuator 176 is energized through Line 562 and the carriage steps to the left. The Non-coded Space Actuator is also energized when the Commutator Brush 320 bridges Contacts D–3—D–4 and D–5—D–6. When Commutation Brush 318 bridges Program Circuit Board Contacts C–1, C–2, the B+ voltage source is connected from Line 400 by means of Lines 560 and the Neon Matrix 3 to punch in a Carriage Return code as a result of the circuit being completed to Horizontal Matrix Lead 446 resulting in the energization of OR gate 266 and the firing of Punch Magnet Thyratron Tube 278. Subsequent movement of the carriage to a position such that the Commutator Brush 318 now complete a circuit between Program Circuit Board Contacts C–3 and C–4 causes another pulse to be delivered from the B+ Lead 400 to Horizontal Matrix Lead 446 and another Carriage Return code is punched. Two carriage Return codes are punched in order to ensure that the output equipment has time to return to the correct carriage position.

When the carriage of the typewriter moves to a position such that Commutator Brush 318 bridges Contacts C–5 and C–6, B+ voltage is applied over Line 464 to a Neon Matrix 3 to cause a circuit to be completed between the Vertical Matrix Lead 464 and the Horizontal Matrix Lead 442 to deliver a pulse to OR gate 262, firing Thyratron 274 to punch in an appropriate line feed code by means of Punch Magnet Actuator 288.

*Function—Reject*

The depression of the manual reject key acts to close normally open Contacts 104 and 106 to energize the Reject Actuator 172 by connecting the B+ Source 400 to the Actuator 172 by means of Lines 586 and 588. The closure of Reject Key Contacts 104 and 106 also energizes the Carriage Return Actuator 188 by completing a circuit through Line 586, Diode 254 and Line 564 to the Carriage Return Actuator 188. This causes an appropriate Carriage Return. At the same time, Reject Actuator 172 actuates an appropriate key on the main Keyboard 2 to punch a Reject code in the tape.

*Function—Program OFF*

To dispense with the format program, the Program OFF-ON Switch is depressed only when the carriage is at the start of a line. This operation is limited to the column 4 carriage position and results in opening Contacts 90 and 92 and closing Contacts 90 and 94. The B+ circuit to Start Switch Contacts 88 and 86 through the Program OFF-ON Switch Contacts 90–92 is broken thus de-energizing the Format Relay 160. Simultaneously, a circuit is completed through the Program OFF Contacts 90 and 94 to the Grid 225 of the Keyboard Lock Clear Tube through Line 552, firing this tube, extinguishing the Keyboard Lock Tube 226 through capacitance coupling through a common connection 608 and Capacitor 330. De-energization of the Keyboard Lock Tube 226 de-energizes the Keyboard Lock Actuator 170, removing the Keyboard Interlock. Since the previous Accept or Reject function has caused the Alpha-Numeric Clear Actuator 192 to be energized, removing any Alpha or Numeric Key Interlock and since the Format Relay 160 is de-energized thus removing the Accept Key Interlock, the typewriter keyboard in Program OFF function is free and clear of any Interlocks with the exception of those under Tab Symbol and Non-format keys.

*Function—Automatic Entry of Keyboard Lock Actuator*

The Keyboard Lock function is programmed to precede any typing or tabulating operations which are initiated electrically, to prevent manual keyboard operation during these format operations. The Keyboard Lock Interlock is effective for all keys with the exception of Accept, Reject, Program Start, and Shift. The Keyboard Lock function is programmed one column before those carriage positions requiring interlocking. For example, if it is desired to lock up the keyboard when the carriage reaches a position such that Commutator Brush 314 bridges Program Circuit Board Contacts A–19, A–20 for automatic energization of the Tab Relay Actuator 186, the Keyboard Lock Actuator must be energized prior to the carriage reaching this position. The Keyboard Lock Actuator 170 is energized in this instance by firing of the Keyboard Lock Tube 226. For firing to occur, the Keyboard Lock Tube 226 acts as an AND gate requiring the energization of both Grid 232 and Grid 230. When the carriage reaches a position such that Commutator Brush 314 bridges Contacts A–17, A–18, only Grid 232 is energized through a circuit from the B+ Line 400, Lead 530, Carriage Return Contacts 52, 54, Escapement Switch Contacts 58–60, Tab Relay Contacts 62–64, Format Relay Contacts 68–72, Auxiliary Keyboard Selection Contacts 310, Line 566, Common 555, Program Circuit Board Contact A–17, Brush 314, Circuit Board Contact A–18, and Lead 568. Grid 230 remains unenergized until a typing action occurs in which Universal Switch Contacts 16 and 18 close thereby energizing Grid 230 by suitable connection from the B+ Line 400 through Lines 404 and 406. The Keyboard Lock Tube 226 now conducts and the Keyboard Lock Actuator 170 is energized locking up the keyboard. Therefore, when the carriage moves one position further to the left so that Commutator Brush 314 now bridges Contacts A–19, A–20, and Tab Relay Actuator 186 is energized over Line 570, the keyboard will already be locked up. Since the Keyboard Lock Tube 226 is a gas tube, the Keyboard Lock Actuator 170 remains energized until a Keyboard Lock Clear, or Tab Unlock Memory, function is programmed.

The Keyboard Lock Clear function is programmed by a suitable connection to Grid 222 by means of Lead 579 and a Tab Unlock Memory function is programmed by a circuit board connection to Grid 214 of Tube 210 by way of Lead 577. When either the Keyboard Lock Clear Tube 218 or the Tab Unlock Memory Tube 210 is energized from the Program Board the Keyboard Lock Tube 226 is extinguished by capacitive coupling between the plates 212, 220 of Tubes 210, 218 and the Plate 228 of Tube 226.

*Function—Automatic Entry-Keyboard Actuators*

A number of the Keyboard Actuators may be energized directly from the Program Board. For example, Actuator 184 may be energized from the Program Board to automatically actuate the numeral 9 contact on the keyboard. Actuators may also be provided for the other numerals. The Actuator 190 is provided for the Comma, Actuator 182 is provided for the Ampersand, Actuator 180 is provided for the Dash, Actuator 178 is provided for the Coed Space and Actuator 186 is provided for the Tab. However, before the automatic energization of any of these Actuators, a Keyboard Lock is always programmed in the preceding column. For example, as set forth previously, the Keyboard Lock was programmed at Contacts A–17, A–18 before the program of a Tab function at the Contacts A–19, A–20.

*Function—Automatic Entry-Keyboard Interlock Actuator*

When the Alpha or Numeric Lock actuators are energized, they interpose bails containing vertically mounted springs under the alpha or numeric keys to prevent keyboard operation. The mechanical aspects of these interlocks are best described in the copending application Serial No. 47,206 to David W. Bernard mentioned above. The bails are moved to the interlock position by movement of the actuator armature and locked in this position by a mechanical latching arrangement. To unlock the keys, the Alpha-Numeric Clear Actuator 192 is energized. The motion of the armature of Actuator 192 unlatches the interlock bail which is returned to its unlocked position by spring force. When the program requires that an alpha field occur immediately after a numeric field or vice versa, it is not necessary to program an alphanumeric clear since the movement of one of the bails moving into the lock position results in unlatching of the other bail.

Since these actuators are returned to ground through normally open Universal Contacts 146 and 150 and the Tight Tape-Tape Out Switch Contacts 132 and 136, the functions must be programmed one column before those carriage positions requiring interlock. These actuators are energized during the period when both the Escapement Switch Contacts 58 and 60 and the Universal Switch Contacts 146 and 150 are closed. The circuit is completed when the Universal Switch Contact 146 transfers from Stationary Contact 148 to Stationary Contact 150 and the circuit is broken when the Escapement Switch Contacts 58 and 60 open.

*Function—Automatic Entry-Unlock Actuators*

Three bails similar to those used to interlock the alpha and numeric keys provide individual interlocks for the Accept, Non-format and Tab Symbol keys. The keys are unlocked only when their respective unlock actuators are energized. For example, the Non-format key is unlocked only when Non-format Unlock Actuator 156 is energized. Since these unlock actuators are returned directly to ground, they are programmed to be energized at carriage positions where unlocking is desired. The actuators are energized by the closure of the Escapement Switch Contacts 60 and 58 and remain energized until the carriage escapement causes the Switch Contacts 58 and 60 to reopen. In a format program, all three keys, Accept, Non-format, and Tab Symbol may be unlocked. In a nonformated program, the Accept key is unlocked by a circuit which is completed from the B+ Line 400 through the Carriage Return Switch Contacts 52 and 54, Line 538, Non-format Contacts 74 and 76 and Format Relay Contacts 80 and 82 to the Accept Unlock Actuator 158. The Non-format and Tab Symbol keys remain locked while in Program OFF format since the program board has no potential while in Program OFF format and the unlock actuators cannot be energized.

*Function—Non-Format Unlock*

The Non-format Unlock function is used when the information to be formated is indefinite or of such a nature that a remarks field is required. In these cases, the operator is permitted to go out of format at those carriage positions where a Non-format Key Unlock is programmed. In FIGURE 1–B, the Non-format Unlock Actuator 156 is programmed at the carriage position designated by Program Circuit Board Contacts D–27, D–28, through appropriate Line Correction 563. In a given format, the option of going out of format may be offered many times during the program, but may be used only once. When the Non-format Key is depressed, the Non-format Relay Contacts 74, 76 open and the Contacts 74–78 close, breaking the circuit from the B+ Line 400 through the Line 530, Carriage Return Contacts 52, 54, Line 538, Line 540, Format Relay Contacts 80 and 84, Line 548, 550 to the Format Relay 160, de-energizing Format Relay 160. At the same time the transfer of the Format Relay Contacts 68 from Stationary Contacts 72 to Stationary Contact 70 grounds the Program Board through Line 524 to the Shift Relay Ground Connection 153. Grounding the Program Circuit Board 8 acts to de-energize the Non-format Unlock Actuator 156, interlocking the Non-format Key.

The transfer of the Non-format Switch Contact 74 from stationary Contact 76 to stationary Contact 78 completes a circuit from the B+ Line 400 through the Carriage Return Switch Contacts 52 and 54, Lines 530 and 538, Non-format Switch Contacts 74 and 78 to the Alpha-Numeric Clear Actuator 192 and the Comma Actuator 198 through Diode 236, Line 542 and Diode 237, Line 544 respectively, thus causing a comma to be printed and the Alpha-Numeric Keys to be unlocked. The length of the Remarks field while in Non-format is limited by programming a Non-format Keyboard Lock to interlock the keyboard and terminate the line at the desired carriage position.

*Function—Non-Format Keyboard Lock*

The Non-format Keyboard Lock function is used to limit the length of the Remarks field after the Non-format Key has been depressed. It is programmed one column before the carriage position where the keyboard interlock is to be effective. The connection to the Grid 232 is made through Connecting Lead 568 to the Program Circuit Board 8 connection A–18, through Commutator Brush 314 to the Bus Common 555 at Contact A–17 to the Auxiliary Keyboard 6 by means of Line 556 and through Auxiliary Keyboard Selection Switch 310, Format Relay Contacts 68–70, and Line 524 to the Shift Relay Ground Connection 153. Grid 230 of the Keyboard Lock Tube 226 is energized by closure of Universal Switch Contacts 16 and 18 to provide a circuit from the B+ Supply Line 400 to Grid 230 by means of Lead 406. When the last typing operation in the field occurs, causing the Keyboard Lock 226 to conduct, the Keyboard Lock Actuator 170 is energized and the Keyboard is locked up. Note that this function can be used only after the program has been switched into Non-format by depression of the Non-format Key. In Format, Format Relay Contact 68 is moved from stationary Contact 70 to stationary Contact 72 is which case Grid 232 cannot be grounded and therefore the Keyboard Lock Tube 226 cannot fire. Note also, that in a Program OFF connection, the Program Board has no potential and therefore Grid 232 cannot be energized when this situation is present.

*Function—Tape Feed*

The depression of the Tape Feed Switch on the typewriter keyboard causes the Tape Switch Contacts 138 and 140, FIGURE 1C, which are normally open, to close. The closure of these switch contacts completes a circuit from the B+ Line 400, Lines 590, 620 and 617 and 618 to ground to energize the Keyboard Lock Actuator 170. A circuit is also completed through the Precedence Switch Contacts 32 and 34 as a result of rotation of Cam 36, Lines 412, 416, Tape Feed #1 Contacts 47 and 49, vertical Neon Matrix Connection 462 of the Neon Matrix—through appropriate Neon Tube Connections 258 to the horizontal Matrix Leads 440, 442, 444, 446, 448 to the OR gates 260, 262, 264, 266, and 268 with resultant energization of the five Punch Magnets 286, 288, 290, 292, and 294 along with the Punch Clutch Magnet 284. Firing of the Punch Clutch Tube acts to rotate the Punch Clutch shaft and Storage Cam Contacts 10 and 12 are opened by rotation of Cam 14, thus extinguishing the Punch and the Clutch Magnet tubes. As the shaft continues to rotate, the Precedence Cam Contacts 32 and 34 open and upon reclosure again energize the Punch Magnet Tube Grids. This process continues as long as the Tape Feed Key is depressed and Tape Switch Contacts 47 and 49, 138, 140 are closed, punching a Tape Feed code for the initial Tape Feed Switch closure and every Precedence Cam Contact operation which follows.

*Function—Tight-Tape*

The Tight-Tape or Tape-Out Key operates to transfer Switch Contact 132 which normally contacts stationary Switch Contact 136 to contact 134, to complete a circuit from the B+ Line 400 through Line 590 to the Keyboard Lock Actuator 170, Lines 620 and 617 to ground, while at the same time breaking the Keyboard Actuator ground return circuit to prevent the automatic input of data from the Program Board. This prevents the entry of information when the tape punch is out of tape and when the tape is too tight for proper operation of the punch.

*Function—Line Feed*

The Line Feed Key is effective only when the typewriter is in Carriage Position 4. As is apparent from the circuit diagram, FIGURE 1B, the closure of Line Feed Contacts 96 and 98 acts to complete a circuit from B+ Line 400, through Line 530, Carriage Return Switch Contacts 52–54, Escapement Switch Contacts 60–58, Line 532, Program Circuit Board Contacts D–7 and D–8, Commutator Brush 320, Line 564, Diode 242, the Line Feed Switch Contacts 96 and 98 to the Carriage Return Relay 188. A mechanical gate (not shown), which is effective only in column 4, limits the Carriage Return motion to approximately one-half the column and eliminates the punching of extra Carriage Return and Line Feed codes. The Escapement Switch Contacts 58 and 60 open and the Carriage Return Switch 52 toggles from Contact 54 to 56, de-energizing the Carriage Return Actuator 188. When the Carriage Return Contact 52 transfers back from Contact 56 to 54, a Line Feed Code is entered in the Punch Circuit by a connection from B+ through Carriage Return Switch Contacts 52–56, 52–54, Line 530, Line 534, Capacitor 306, Program Board Contacts B–5, B–6, Commutator Brush Segment 316, Program Board Contact C–6, vertical Matrix Lead 464, horizontal Matrix Lead 446, thus completing a circuit to OR gate 266 and firing Punch Tube 278, energizing Punch Magnet 292 and Punch Clutch Magnet 284 in a conventional manner. This sets up a Line Feed code. If the Line Feed Key is held in the depressed state, holding Contacts 96 and 98 closed, the cyclic reclosure of the Escapement Switch Contacts 58 and 60 again energizes the Carriage Return Actuator 188 and the cycle repeats in the aforementioned manner.

*Function—Tab Indent (Automatic Tabulation)*

A Keyboard Lock is always programmed in the column preceding automatic tabulation.

When the Escapement Switch Contacts 58 and 60 close at the carriage position where an automatic tabulation is programmed, the Tab Actuator 186 is energized by a circuit which is completed through the Program Circuit Board 8 which, for example, may make use of Contacts A–19, A–20 in row A of the Program Circuit Board. The circuit is completed from B+ Line 400 through Line 530, Carriage Return Contacts 52–54, Escapement Contacts 58–60, Tab Relay Contacts 62–64, Line 528, Format Relay Contacts 68–72, Auxiliary Keyboard Selection Switch 310, Line 556 to Bus 555, the Program Circuit Board Contacts A–19, A–20 through Commutator Brush 314 to Line 570 connected directly to the Tab Actuator 186 with the Actuator grounded through Resistance 326. In the example shown, the apparatus is operating under Format 1 with the Auxiliary Keyboard Selection Switch Contacts 310 closed delivering power to Power Bus 555 and when the Commutator Brush 314 moves with respect to the Program Circuit Board to a point where the Contacts A–19, A–20 are bridged, the Tab Actuator is energized. As a result, a mechanical operation occurs in which the Escapement Loose Dog (not shown) is disengaged from the Escapement Wheel (not shown) allowing the carriage to tabulate to the left. At the same time, Tab Switch Contacts 112 and 114, FIGURE 1C, are closed connecting the B+ Line 400 through Common 590, Line 592, to Plate 200 of the Tab Stop Tube 198. Simultaneously, a circuit is completed through the now closed Tab Switch Contacts 112 and 114 by means of Branch Line 600 and Line 602 to the Tab Relay 162 energizing this relay.

*Function—Tab Stop*

When the Tab Relay 162 is energized, Tab Relay Contacts 62–64, FIGURE 1B, open and Contacts 62–66 close, acting to ground the Program Circuit Board 8 through Line 524 and the Shift Relay Ground Connection 153. Simultaneously, Tab Relay Contacts 124, 126, which are normally open, close to permit the Grid 204 of the Tab Stop Tube 198 to be energized through Line 574. Carriage tabulation continues until the carriage arrives at a position where a Tab Stop is programmed. At this point the Commutator Brush 314, assuming the operation is continuing as a result of selection of Auxiliary Keyboard Format Selection Switch 310, completes a circuit from ground through the Tab Relay Contacts 62–66, Format Relay Contacts 68–72, Auxiliary Keyboard Selection Switch 310, Lead 566 to Bus Board Common 555, Program Circuit Board Contacts A–23, A–24, Brush 314, and Line 574 to Grid 204 of the Tab Stop Tube 198 grounding this grid. This ground signal causes the tube to conduct and the Tab Stop Actuator 164 to be energized. The motion of the Tab Stop Actuator arm (not shown) unlatches a spring-loaded Tab Stop Blade of the conventional type which contacts the tabulator stop within the carriage mechanism in a conventional manner. This action allows the Loose Dog to restore into the Escapement Wheel and to stop carriage motion one column later. At this time, the mechanical Tab Switch is operated opening Tab Contacts 112 and 114 to de-energize Tab Relay 162, extinguishing the Tab Stop Tube 198. Tab Relay Contacts 62–66 open and Tab Relay Contacts 62–64 close, reconnecting the B+ Line 400 to the Program Circuit Board 8. The Tab Stop function is programmed one column before the position it is desired to stop the carriage.

*Function—Tab Symbol Unlock*

When a Tab Unlock is programmed as described in the paragraph entitled "Automatic Entry-Unlock Actuator," the operator may initiate a tabulation by depressing the Tab Symbol Key acting to close normally open Tab Symbol Switch Contacts 108 and 110. Closure of Contacts 108–110 connects the B+ Line 400 through Lead 602 and Diode 246, to the Tab Relay 162, thus energizing this relay. Simultaneously, Plate 200 of the Tab Stop Tube 198 is energized through the Tab Stop Actuator, Line 592 and Cross-connector Lead 600. At the same time, the Dash Actuator 180 and the Tab Actuator 186 are energized through Common Lead 610 and Branch Lead 612, which connect these relays to the B+ Line 400 through appropriate Diodes 250 and 252. This causes a dash to be printed and a tabulation as described in the paragraph entitled "Tab Indent-Automatic" to occur. The motion of the Ribbon Universal Bar resulting from the printing of the Dash Symbol acts to close the Universal Switch Contacts 16 and 18 energizing Grid 230 of the Keyboard Lock Tube through Line 406 which results in firing of the Keyboard Lock Tube 226, energizing the Keyboard Lock Actuator 170 and interlocking the keyboard.

*Function—Tab Unlock Memory*

If the specific carriage position where an operator may desire to tabulate is indefinite, the Tab Unlock Memory function is used. When the Tab Unlock Memory function is programmed, Grid 214 of the Tab Unlock Memory Tube 210 is energized through Lead 577, causing the tube to fire. Current then flows from B+ Line 400 through Common Line 590, Format Relay Contacts 120 and 122 which are closed as a result of energization of the Format Relay Actuator 160, the Tab Unlock Memory Relay 168, Line 596, the Tab Unlock Memory Tube 210 to ground. Energization of the Tab Unlock Memory Relay 168 closes Tab Unlock Memory Relay Contacts 116 and 118 completing another circuit from the B+ Line 400 through Common Line 590, Line 594, to the Tab Unlock Actuator 166 and ground. This results in unlocking of the Tab Symbol Key. Since the Tab Unlock Memory Tube 210 is a gas tube, the Tab Symbol Key remains unlocked until a Keyboard Lock or a Keyboard Clear function is programmed. Under this program, either the Keyboard Lock Tube 226 or the Keyboard Lock Clear Tube 218 will fire causing the Tab Unlock Memory Tube 210 to be extinguished by capacitive coupling through Lines 606, 608 and Series Capacitors 328 and 330. With Tab Unlock Memory Tube 210 extinguished, the Tab Unlock Memory Relay 168 is de-energized, opening Tab Unlock Memory Relay Contacts 116 and 118 to de-energize the Tab Unlock Actuator 166. As a result, the Tab Symbol Key is now interlocked.

While there have been shown and described and pointed out the fundamental novel features of the invention as applied to a preferred embodiment, it will be understood that the various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said non-coded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, an accept key, a carriage return actuator, an accept actuator, an accept code matrix lead, means responsive to the depression of said accept key for energizing said carriage return actuator and said accept actuator, means responsive to energization of said carriage return actuator for returning said carriage to said extreme left carriage position and means responsive to energization of said accept actuator for energizing the accept code matrix lead and punching an accept code designation in said tape.

2. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said non-coded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, an accept key, an accept unlock actuator acting to unlock said accept key, means responsive to non-format operation for energizing said accept unlock actuator, means responsive to format operation for de-energization of said accept unlock actuator, a non-format key, a non-format unlock actuator, means responsive to energization of said non-format unlock actuator for unlocking said non-format key, means connecting said non-format unlock actuator to one of said contacts of one of said rows of contacts of said program circuit board, and means responsive to movement of said typewriter carriage for supplying electrical potential to said non-format unlock actuator when said typewriter carriage reaches said designated position for allowing operation of said non-format key to permit machine operation including operation of said accept key independently of control by said program circuit board.

3. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said non-coded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, a keyboard lock actuator for locking said main keyboard, first means coupled to said program circuit board for energizing said keyboard lock actuator, and second means coupled to said program circuit board and responsive to operation of said first means for de-energizing said keyboard lock actuator and unlocking said main keyboard.

4. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said non-coded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, a keyboard lock actuator, a keyboard lock tube connected in series with said keyboard lock actuator, means coupled to said program circuit board for firing said keyboard lock tube and energizing said keyboard lock actuator, a keyboard lock clear tube, capacitive coupling means between said keyboard lock clear tube and said keyboard lock tube, and means coupling said program circuit board and said keyboard lock clear tube for firing said keyboard lock clear tube subsequent to firing of said keyboard lock tube upon carriage escapement to a predetermined position, whereby said capacitive coupling means acts to extinguish said keyboard lock tube and de-energize said keyboard lock actuator to unlock said main keyboard.

5. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said non-coded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, an auxiliary keyboard switch means associated with said auxiliary keyboard for energizing said program circuit board, a keyboard lock tube, a keyboard lock actuator connected in series with said keyboard lock tube, means effective during energization of said program circuit board through said auxiliary keyboard switch means for firing said keyboard lock tube and energizing said keyboard lock actuator, a keyboard lock clear tube, capacitive coupling means between said keyboard lock clear tube and said keyboard lock tube, and means responsive to movement of said auxiliary keyboard switch means and de-energization of said program circuit board for energization of said keyboard lock clear tube whereby said keyboard lock actuator and said keyboard lock tube is de-energized and said main typewriter keyboard is unlocked.

6. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said non-coded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, a keyboard lock actuator, precedence switch contacts connected in series with said keyboard lock actuator, tape feed contacts connected in parallel with said precedence contacts and in series with said keyboard lock actuator, tight tape-tape out switch contacts connected in parallel with said tape feed contacts and said precedence contacts and in series with said keyboard lock actuator, and means responsive to operation of said system for selectively closing said tight tape-tape out, said tape feed contacts or said precedence contacts for energizing said keyboard lock actuator and locking said main keyboard.

7. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said noncoded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, a function performing actuator connected to one of said contacts of said row of contacts at a given carriage position, a keyboard lock tube, said keyboard lock tube including at least one grid, means connecting said grid to said carriage position program circuit board contact immediately preceding said function performing actuator connected contact, a keyboard lock actuator connected in series with said keyboard lock tube, said system operating such that said keyboard lock tube grid is energized by said moving carriage immediately preceding energization of said function performing actuator whereby, upon firing of said keyboard lock tube, said keyboard lock actuator is energized locking said main keyboard prior to energization of said function performing relay through said program circuit board format.

8. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said noncoded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, a format relay, said format relay acting to connect the electrical potential supply circuit to said program circuit board, a non-format switch, a non-format unlock actuator, means connecting said non-format unlock actuator to said program circuit board for energization in response to movement of said carriage across said stationary program circuit board, means responsive to energization of said non-format unlock actuator for unlocking said non-format switch, means responsive to depression of said non-format switch for de-energization of said format relay and de-energization of said program circuit board resulting in de-energization of said non-format unlock relay, an alpha-numeric clear actuator, means responsive to depression of said non-format switch for energization of said alpha-numeric clear actuator whereby said letters and numeral keys are unlocked to allow typing of a remarks field.

9. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said noncoded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, a keyboard lock tube including at least one grid connection, a keyboard lock actuator connected in series with said keyboard lock tube and adapted to be energized upon firing of said tube to lock said main keyboard, means responsive to de-energization of said format relay for grounding said program circuit board, means for connecting the grid of said keyboard lock tube to one of said contacts of said program circuit board and means responsive to movement of said typewriter carriage for completing a circuit from said grounded program circuit board to said keyboard lock tube grid for firing said keyboard lock tube at said designated carriage position to energize said keyboard lock actuator and lock said main typewriter keyboard.

10. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said noncoded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, a keyboard lock actuator, a normally open tape feed switch, means responsive to closure of said tape feed switch for feeding tape, and means responsive to closure of said tape feed switch for energizing said keyboard lock actuator whereby said main typewriter keyboard is locked during feeding of said tape.

11. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said noncoded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, normally open tape feed switch contacts, normally closed precedence cam contacts, a series circuit including a source of electrical potential, said precedence cam contacts and said tape feed contacts, a matrix input lead including means for completing appropriate tape feed code connections with matrix output leads to effect the punching of a tape feed code in said tape upon closure of said precedence cam contacts and said tape feed switch contacts.

12. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said noncoded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, a tab actuator, means responsive to energization of said tab actuator for allowing said carriage to move rapidly in a given direction, means connecting said tab actuator to one contact of one row of contacts of said program circuit board, and means responsive to movement of said carriage to said contact to cause energization of said tab actuator.

13. The system as claimed in claim 12 further including a tab stop tube including at least one grid, a normally open tab relay switch connected in series with said grid and a second contact in said given row of contacts within said program circuit spaced from said first contact, a tab stop actuator connected in series with said tab stop tube, said grid of said tab stop tube being pulsed by movement of said carriage to a position where said second contact of said given line of contacts is contacted by said means associated with said carriage whereby said tab stop tube fires and said tab stop actuator is energized to stop rapid movement of said typewriter carriage in said given direction.

14. A typewriter-controlled tape punch system comprising a typewriter having a main keyboard for initiating desired typewriter functions, a moving carriage, punch means for causing a coded representation of said typewriter functions to be recorded on the tape, an encoding matrix for selectively energizing said punch means in response to actuation of said main keyboard, a program circuit board including a plurality of contacts, a plurality of typewriter function-performing actuators, means connecting said actuators individually to said contacts, means responsive to the position of the carriage for energizing selected contacts for automatically operating selected function-performing actuators, a noncoded carriage space actuator, means connecting said noncoded carriage space actuator to said program circuit board at each of at least the first two carriage positions for automatically causing carriage escapement from these positions, means responsive to energization of said function-performing actuators for energizing selected ones of said punch means for causing coded information to be punched into said tape indicative of individual function performing actuators energized by said moving carriage, a normally open tab symbol switch, a tab actuator, a dash actuator and a tab relay, means operable upon closure of said tab symbol switch for energization of said tab relay, said tab actuator and said dash actuator, a tab stop actuator, a tab stop tube in series with said actuator and said tab symbol switch, means responsive to closure of said tab symbol switch contact to complete a circuit through said tab stop actuator to the plate of said stop tube, and program circuit board means acting to energize the grid of said tab stop tube upon the carriage reaching a pre-determined position for firing said tab stop tube and energizing said tab stop actuator for stopping said moving carriage.

15. The system as claimed in claim 14 further including a tab unlock memory tube, a tab unlock memory relay, means associated with said circuit board for firing said tab unlock memory tube and energizing said tab unlock memory relay, a tab unlock actuator, normally open tab unlock memory relay contacts in series with said tab unlock actuator and means for energizing said tab unlock actuator upon closure of said tab unlock memory relay contacts, whereby said tab symbol key is unlocked allowing subsequent tabulation.

16. The system as claimed in claim 15 further including a keyboard lock clear tube and a keyboard lock tube and capacitive coupling means between said tab unlock memory tube, said keyboard lock clear tube and said keyboard lock tube, whereby firing of either of said keyboard lock clear tube or said keyboard lock tube acts to extinguish the tab unlock memory tube, de-energizing said tab unlock memory relay and said unlock actuator to interlock said tab symbol key.

References Cited in the file of this patent

UNITED STATES PATENTS

| | | |
|---|---|---|
| 2,905,244 | Sonnanstine | Sept. 22, 1959 |
| 3,023,952 | Thomas | Mar. 6, 1962 |